United States Patent [19]

Upham

[11] Patent Number: 4,572,416
[45] Date of Patent: Feb. 25, 1986

[54] ENCLOSING-TYPE FISHING POLE CARRIER

[76] Inventor: Niel F. Upham, 27519 W. Nine Mile Rd., Farmington Hills, Mich. 48024

[21] Appl. No.: 664,500

[22] Filed: Oct. 25, 1984

[51] Int. Cl.$^4$ .............................................. B60R 9/00
[52] U.S. Cl. ..................................... 224/326; 224/922
[58] Field of Search ............... 224/326, 319, 922, 309; 43/26

[56] References Cited

U.S. PATENT DOCUMENTS

| 1,520,543 | 12/1924 | Meachen . | |
| 2,473,977 | 6/1949 | Tutton | 224/922 X |
| 2,749,645 | 6/1956 | McKern | 224/922 X |
| 3,349,512 | 10/1967 | Walker | 43/26 |
| 3,524,572 | 8/1970 | Hall . | |
| 3,662,933 | 5/1972 | Michal . | |
| 3,972,144 | 8/1976 | Geisler | 43/26 |
| 4,335,840 | 6/1982 | Williams . | |

FOREIGN PATENT DOCUMENTS 1419803 10/1965 France .................................... 43/26

Primary Examiner—Stephen Marcus
Assistant Examiner—Robert Petrik
Attorney, Agent, or Firm—Hauke and Patalidis

[57] ABSTRACT

This invention improves upon enclosing-type fishing pole carriers for holding and protecting fishing poles in their assembled conditions. The fishing pole carrier of the invention has a plurality of parallel spaced-apart tubular members having open-ended slots at their entry ends so as to slidably receive therein the posts for the reels of the respective fishing poles held in the tubular members so that all of the fishing poles are held firmly against movement, ready for immediate use. A waterproof flexible hood is provided for covering the upstanding reels and a closure cap is fitted over the entry end of each tubular member. An arrangement is provided for locking the closure caps to the tubular members to prevent unauthorized access to the fishing poles.

5 Claims, 8 Drawing Figures

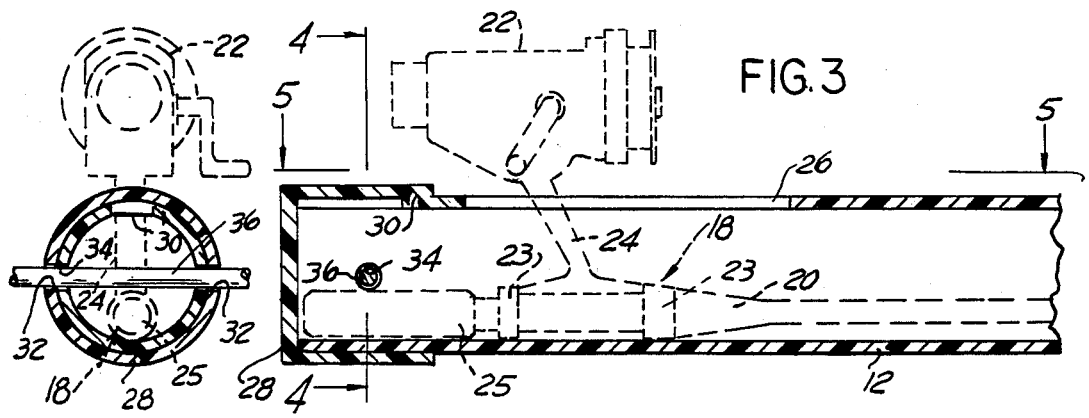
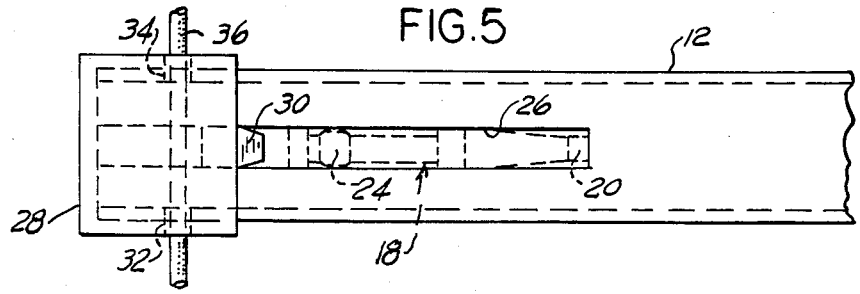
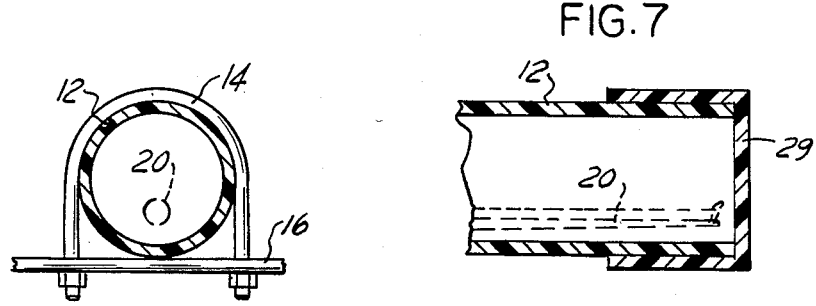
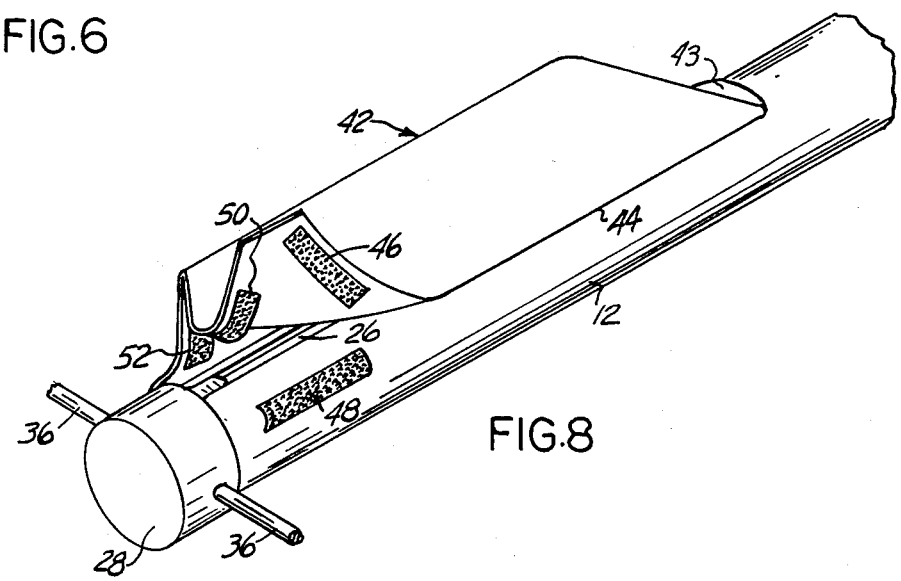

ENCLOSING-TYPE FISHING POLE CARRIER

BACKGROUND OF THE INVENTION

This invention relates to enclosing-type fishing pole carriers, particularly for attachment to the rooftops of motor vehicles or water craft.

Heretofore, fishing pole carriers of the type to which the instant invention pertains have been proposed, but have not enjoyed widespread use for a number of reasons. To fabricate an enclosing-type fishing pole carrier; i.e., one which fully encloses the fishing pole, requires expense in materials and fabrication (e.g., see U.S. Pat. No. 3,662,993). The instant invention provides an improved enclosing-type fishing pole carrier which uses a minimum of material and requires a minimum of manufacturing expense. Some fishing pole carriers allow too much movement of the fishing poles carried thereby and are not universal for most vehicles but, must be retrofitted to just certain types of vehicles having factory-furnished rooftop carriers e.g. see U.S. Pat. No. 4,335,840. The improved enclosing-type fishing pole carrier of this invention is universal for most vehicles and holds the fishing poles carried thereby firmly with a minimum amount of movement and with the fishing reel fitted to the pole, ready for immediate use.

SUMMARY OF THE INVENTION

This invention improves upon enclosing-type fishing pole carriers for holding fishing poles in their assembled conditions. The fishing pole carrier of the invention has a plurality of axially spaced-apart tubular members each having an open-ended slot at the entry end thereof so as to slidably receive therein the support post of the reel mounted on the fishing pole or rod disposed in the tubular member, so that all of the fishing poles are held firmly against movement, each in a separate tubular member, ready for use. A water-proof flexible hood is provided for covering the upstanding reels and a cap is fitted over the entry end of each tubular member. Means are provided for locking the caps to the tubular members to prevent unauthorized access to the fishing poles.

The diverse objects and advantages of the present invention will become apparent to those skilled in the art when the following description of the best mode contemplated for practicing the invention is read in conjunction with the accompanying drawing wherein:

BRIEF DESCRIPTION OF THE DRAWING

FIG. 3 is a fragmentary vertical sectional view of a part of the structure of FIG. 2 taken on the line 3—3 thereof;

FIG. 4 is a vertical sectional view of the structure of FIG. 3 taken on the line 4—4 thereof;

FIG. 5 is a top plan view of the structure of FIG. 3 as viewed along the line 5—5 thereof;

FIGS. 6 and 7 are respective vertical sectional views of the structure of FIG. 2 taken, respectively, on the line 6—6 and 7—7 thereof; and FIG. 8 is a fragmentary top perspective view of a part of the structure of FIG. 1.

DETAILED DESCRIPTION OF THE PREFERRED EMBODIMENT

Figure 1:
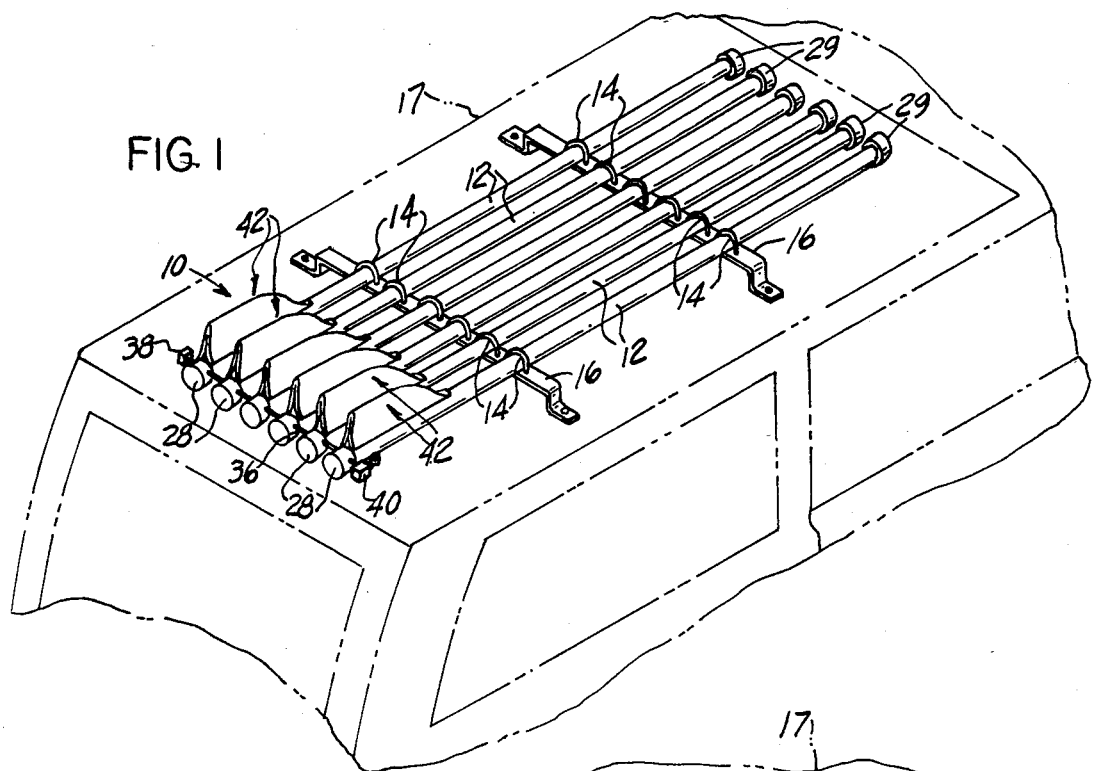
FIG. 1 is a top perspective view of an improved enclosing-type fishing pole carrier embodying the invention shown mounted on the rooftop of a motor vehicle, for example.
Figure 2:
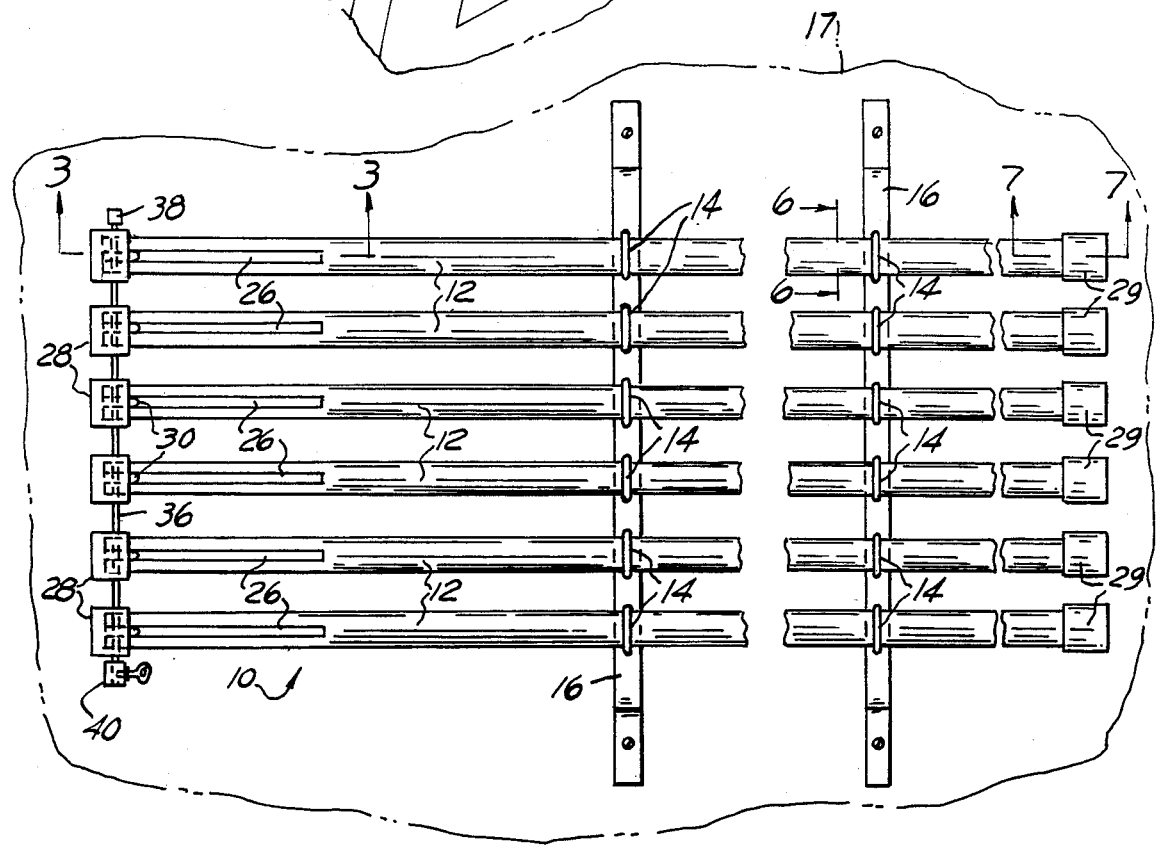
FIG. 2 is a top plan view, with parts removed, of the fishing pole carrier.

Referring now to the drawings in greater detail, 10 generally designates the improved fishing pole carrier embodying the invention which comprises, inter alia, a plurality of axially spaced-apart tubular members 12 suitably fastened, as at 14, to a pair of transverse supporting rails 16 adapted and intended, as is well known, to mount upon the rooftop 17 of a motor vehicle, as shown. The tubular members 12, which can be made of suitable plastic or synthetic resin, have entry ends arranged at the rear end of the carrier 10 into which assembled fishing poles are respectively inserted, such as the one shown and designated generally by numeral 18 at FIGS. 3-5. The fishing pole 18, in its assembled condition, consists of a rod 20, a reel 22 and other associated paraphernalia, such as a fishing line, hooks and the like, not shown, the reel 22 being fastened, as by a pair of rings 23, to the rod 20 proximate the rod handle 25. The reel 22 upstands from the rod 20 via a post 24. Each tubular member 12 is provided with an open-ended slot 26 in its top wall at its entry end so as to slidably receive therein the reel post 24 of the respective fishing pole 18 held therein. Front and rear caps 28 and 29, respectively, are provided which force-fit over opposite ends of each tubular member 12. The front cap 29 is made permanently fast, by suitable adhesive for example, to the non-entry, or closed end of the tubular member.

The rear cap 28, or closure cap 28, has alignment means thereon in the form of a longitudinal key 30 fastened on, or made integral with its inside surface, as shown. The key 30 fits in the slot 26 and slides therein during insertion or removal of the closure cap 28. The closure cap 28 is also provided with a pair of diametrically disposed apertures 32 in opposite side walls. Each tubular member 12 also has a pair of diametrically disposed apertures 34 in opposite side walls which are so located that, by virtue of the key 30 slid in the slot 26, they align with the apertures 32 when the closure cap 28 is inserted over the entry end of the tubular member 12. The aligned apertures 32, 34 serve as locking means to lock each closure cap 28 on the open end of each tubular member 12. In the example of structure shown, a locking rod 36 is provided for insertion through all of the aligned apertures 32, 34 at one time; the rod 36 having an enlarged head 38 on one end thereof and a removable locking mechanism 40 on the other end thereof, whereby all of the closure caps 28 are simultaneously locked to their respective tubular members 12.

Preferably, the carrier 10 also comprises a water-proof flexible hood 42, shown only at FIGS. 1 and 8 for the sake of clarity fastened to each tubular member 12 above the slot 26 therein for covering the reel 22 as it upstands above the tubular member 12. The hoods 42 can be made of suitable plastic or synthetic resin, preferably cloth lined. Each hood 42 extends rearwardly toward the entry end of the respective tubular member 12 further than the length of the slot 26 therein. The front edge 43 and the forward lateral edges 44 of the hood 42 are permanently fast, as by means of a suitable adhesive, to the tubular member 12 while the remaining rear portion thereof is releasable, or detachable from the surface of the tubular member 12. The detachable rear portion of the hood 42 and the corresponding surface portions of the tubular member 12 on each side of the slot 26 are provided with complementary releasable fastener means for allowing opening and closing the rear portion of the hood 42, as desired. In the instance shown, the fastener means are in the form of complementary strips 46 and 48 of hook and loop "Velcro" (Trademark) material and a second pair of mating complementary hook and loop "Velcro" strips 50 and 52 are fastened to opposite sides of the inside surface of the hood 42, proximate the edge thereof. When the fastener strips 46-48 and 50-52 are released, the detachable rear portion of the hood 42 can be folded forwardly toward the stationary front portion thereof to make room for the reel 22 during insertion or removal of the assembled fishing pole 18. When the strips 46-48 and 50-52 are mutually reattached to close the hood 42, the reel 22 is protected against the elements.

In use of the carrier 10, the rails 16 are simply fastened, as is well known, to the rooftop of the motor vehicle 17 so that such that the carrier is ready for use to carry fully assembled fishing poles. When it is desired to insert fishing poles 18 into the tubular members 12, the locking mechanism 36, 38, and 40 is simply removed and the appropriate closure caps 28 are removed. The fishing poles 18, in their assembled condition, are inserted each on one of the tubular members 12 so that the reel post 24 of the fishing pole slides into the slot 26. The closure cap 26 is then replaced over the open end of the tubular member 12 and this procedure is repeated for each fishing pole 18 that it is desired to transport in the carrier 10. Thereafter, the fishing poles 18 are securely locked each in a tubular member 12, via the locking mechanism 36, 38, and 40, and the upstanding reels 22 are protected by closing off the detachable rear portion of the respective hoods 42 by means of the aforementioned "Velcro"-type fasteners. The front portion of the hoods 42 tapers downwardly at the front for better appearance and for decreasing wind resistance. The fishing poles 18 are thus held safely in the tubular members 12 of the carrier 10, with the reels 22 in an upright position, and are subjected to a minimum amount of movement during motion of the motor vehicle. Upon arrival at the fishing site and when it is desired to use the fishing poles 18, all that is required is to simply unlock the closure caps 28 from the tubular members 12 and withdraw the fishing poles from the carrier 10. The fishing poles are in condition for immediate use, fully extended and fully rigged.

It will thus be seen that there has been provided by this invention improvements in an enclosing-type fishing pole carrier for holding fishing poles in their assembled condition in which the objects hereof have been successfully achieved. The fishing poles and the attached reels are fully enclosed and protected from the elements. The fishing pole carrier is simply mounted on most vehicle rooftops with minimal effort.

While a preferred embodiment of this invention has been shown and described, it is to be understood that variations and changes may be resorted to without departing from the spirit of the invention as defined by the appended claims.

I claim:

1. An enclosing-type fishing pole vehicle roof-top carrier for carrying a plurality of fishing poles, at least one of said fishing poles being provided with a fishing reel having a support post attached thereto, said carrier comprising a plurality of elongated substantially rigid tubular members, support means for holding said plurality of tubular members in an axially spaced-apart relationship and for attaching said tubular members to a vehicle rooftop, each of said tubular members having an open entry end and a closed end, a longitudinal slot having a closed end and an open end at the entry end of said tubular member for slidably receiving therein the support post of the fishing reel disposed in said tubular member and introduced into said open entry end, a removable closure cap fitted over said open entry end, means for locking said closure cap to said tubular member, and a waterproof flexible hood fastened to said tubular member over said slot for covering said fishing reel, said flexible hood having a closed end attached to said tubular member beyond the closed end of said slot and an openable end portion adapted for passage therethrough of said fishing reel mounted on said fishing pole when said fishing pole is inserted into said tubular member, wherein each of said tubular members contains a single fishing pole rigged with a fishing reel.

2. The carrier of claim 1 wherein said hood openable end portion is detachable from said tubular member.

3. The carrier of claim 1 wherein said hood closed end portion is tapered.

4. The carrier of claim 1 wherein said locking means comprises apertures in each closure cap and corresponding apertures in each tubular member, means for aligning the respective apertures, and a single locking bar passed through said aligned apertures for locking each closure cap to a corresponding tubular member.

5. The carrier of claim 4 wherein said means for aligning the apertures comprises a key made fast to the inside surface of the closure cap, said key fitting in said slot and sliding therein during insertion or removal of said closure cap.

* * * * *